US007023585B1

(12) United States Patent
Borg (10) Patent No.: US 7,023,585 B1
(45) Date of Patent: Apr. 4, 2006

(54) MULTI-DIMENSIONAL EDGE INTERPOLATION

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 890 days.

(21) Appl. No.: 10/010,209

(22) Filed: Dec. 6, 2001

(51) Int. Cl.
*G06F 15/00* (2006.01)

(52) U.S. Cl. .................. 358/1.9; 358/525; 345/604; 345/606; 345/591; 708/290; 708/308; 382/300

(58) Field of Classification Search ............... 358/525, 358/1.1, 518; 345/606, 604, 591, 502, 600, 345/426; 708/290, 308; 382/300, 167, 232
See application file for complete search history.

(56) References Cited

U.S. PATENT DOCUMENTS

| 4,446,529 | A | * | 5/1984 | Strolle ..................... 708/290 |
| 4,511,989 | A | | 4/1985 | Sakamoto ................ 364/723 |
| 4,901,266 | A | * | 2/1990 | Takagi ...................... 708/290 |
| 5,345,541 | A | * | 9/1994 | Kelley et al. ............. 345/426 |
| 5,428,465 | A | * | 6/1995 | Kanamori et al. ........ 358/518 |
| 5,677,967 | A | * | 10/1997 | Pariser .................... 382/167 |
| 5,678,033 | A | * | 10/1997 | Moledina et al. ......... 345/502 |
| 5,774,386 | A | * | 6/1998 | Pawle ...................... 708/290 |
| 6,292,195 | B1 | * | 9/2001 | Shimizu et al. ........... 345/604 |
| 6,373,580 | B1 | * | 4/2002 | Walker .................... 358/1.1 |
| 6,389,161 | B1 | * | 5/2002 | Krabbenhoft ............. 382/167 |
| 6,404,927 | B1 | * | 6/2002 | Li et al. ................... 382/232 |
| 6,415,065 | B1 | * | 7/2002 | Miyake .................... 382/300 |
| 2002/0008709 | A1 | * | 1/2002 | Suzuki ..................... 345/600 |

OTHER PUBLICATIONS

Henry Kang, Color Technology for Electronic Imaging Devices, Chapter 4, 3D Lookup Table with Interpolation, Jan. 1, 1997, SPIE—the International Society for Optical Engineering.

* cited by examiner

*Primary Examiner*—Kimberly Williams
*Assistant Examiner*—Beniyam Menberu
(74) *Attorney, Agent, or Firm*—Fish & Richardson P.C.

(57) ABSTRACT

Methods and apparatus, including computer program products, implementing and using techniques for using a color table defining a mapping from a source color space representing colors in source color coordinates to a destination color space representing colors in destination color coordinates. An input color in the source color space is received. A location of the input color in a cell of the color table is determined in terms of cell coordinate values in a cell coordinate system. The cell coordinate values are ordered to determine a processing order of the dimensions of the source color space. The cell coordinate values are used to calculate an output color in the destination color space, making no more interpolation calculations than the number of source color space dimensions multiplied by the number of destination color space dimensions.

24 Claims, 3 Drawing Sheets

MULTI-DIMENSIONAL EDGE INTERPOLATION

BACKGROUND

The present invention relates to conversion of colors between two color spaces.

In order to use colors in computers and related output devices, such as displays and printers, the colors have to be represented numerically. A color is specified or represented in the form of one or more color components, which can be thought of as dimensions in a color space. Each color component has a numerical value and together the color component values provide the information necessary to generate a desired color on an output device. A color space defines the interpretation of the color component values used to represent a color. Examples of color spaces are RGB (Red, Green and Blue) and CMYK (Cyan, Magenta, Yellow and Black). For most color spaces, a color is represented by one to four numbers, one for each dimension or component of the color space.

Different output devices use different color spaces to represent colors, which creates a need for converting colors between different color spaces. A frequently used method for converting color component values from a source color space to a destination color space is to use a multi-dimensional color table. The color table contains a set of reference colors in the source color space, and corresponding mappings to reference colors in the destination color space. For example, when the source color space is L*a*b* (luminance, red/blue chrominance and yellow/blue chrominance) and the destination color space is CMYK (Cyan, Magenta, Yellow and Black), a CMYK output color corresponding to an L*a*b* input color can be obtained by looking up the L*a*b* color value in an L*a*b* to CMYK table. In most cases, the reference colors in a color table do not include all possible input colors. The output colors for input colors that are not reference colors are obtained by interpolating among the existing reference colors in the L*, a*, and b* dimensions, respectively.

Several interpolation methods are available. Linear interpolation is a commonly used interpolation method but is slow, so other, faster methods have been developed for special cases. For three-dimensional tables, there are prism, pyramid and tetrahedral interpolation methods. One example of a tetrahedral interpolation method is described in "Color Technology for Electronic Imaging Devices" by Henry Kang, page 68 ff, published Jan. 1, 1997, by SPIE—the International Society for Optical Engineering. For tables with four or more dimensions there are higher order interpolation methods. One such method is described in U.S. Pat. No. 4,511,989 to Sakamoto.

When the number of dimensions grows bigger than four, linear interpolation is a commonly used, but inefficient interpolation method, as will be shown by the following example. Assume that a user wishes to convert an input color having N color components to an output color having M color components. For linear interpolation in an N-dimensional table storing M-tuples, the required number of interpolation calculations is $(2^N-1) \cdot M$. An interpolation calculation here refers to an interpolation calculation in a single dimension and a single output value calculation, such as $c2=c0+x(c1-c0)$. For example, when interpolating from Hexachrome (N=6) to XYZ (M=3), 189 (or 63·M) calculations are needed. The factor 63 seriously affects the overall performance. Even more input dimensions are needed when modeling the interaction of, for example, eight inks on a printing press. If the input data is spectral data (N=32), then approximately $4.3 \cdot M \cdot 10^9$ calculations are needed. Thus, there is a need for a more efficient interpolation method for higher dimensions than the currently used linear interpolation method.

SUMMARY

In general, in one aspect, this invention provides methods and apparatus, including computer program products, implementing and using techniques for using a color table. The color table defines a mapping from a source color space representing colors in source color coordinates to a destination color space representing colors in destination color coordinates. The color table defines for each of a domain of source colors in the source color space a corresponding destination color in the destination color space. An input color represented in the source color space is received. A location of the input color in a cell of the color table is determined in terms of cell coordinate values in a cell coordinate system. Each corner of the cell represents a source color and a corresponding destination color and each coordinate value corresponds to a dimension of the source color space. An order of the cell coordinate values is determined. A processing order of the dimensions of the source color space is determined according to the order of the cell coordinate values. The cell coordinate values are used in the processing order to calculate an output color represented in the destination color space, making no more interpolation calculations than the number of source color space dimensions multiplied by the number of destination color space dimensions.

Advantageous implementations can include one or more of the following features. Determining an order can include determining an order of the cell coordinate values from large to small. Determining an order can include determining an order of the cell coordinate values from small to large. Using the cell coordinate values in the processing order to calculate an output color can include interpolating a contribution to the output color from each cell coordinate value associated with the input color until a termination condition is reached, while excluding previously processed cell coordinates, and adding the interpolated contributions to generate an output color corresponding to the input color. The termination condition can be that all cell coordinate values associated with the input color have been processed. The termination condition can be that a cell coordinate value of zero has been reached.

Using the cell coordinate values in the processing order to calculate an output color can include interpolating, in parallel, contributions to all destination color coordinates associated with the output color from each source color coordinate associated with the input color. Using the cell coordinate values in the processing order to calculate an output color can include interpolating a contribution to one destination color coordinate associated with the output color from each source color coordinate associated with the input color and repeating the interpolating step for all remaining destination color coordinates associated with the output color.

All source color coordinates that are associated with the input color and that have identical values can be processed simultaneously by interpolating a contribution to the destination color coordinates associated with the output color. Using the cell coordinate values in the processing order to calculate an output color can include assigning the destination color coordinates associated with the output color to be equal to the destination color coordinates for the destination color corresponding to the source color if the input color corresponds to a source color represented in a cell corner.

Each cell can have a cell coordinate system with a same range of coordinate values. The source color space and the destination color space can be selected from the group of color spaces consisting of RGB, CMY, L*a*b*, YCC, L*u*v*, Yxy, HSV, CMYK, MCYK, RGBW, hexachrome, and spectral data color spaces. The cell coordinate system can be aligned with at least one edge of a cell of the color table.

In general, in another aspect, this invention provides methods and apparatus, including computer program products, implementing and using techniques for using a color table to determine an output color in a destination color space based on an input color in a source color space. The color table defines a mapping from the source color space representing colors in source color coordinates to a destination color space representing colors in destination color coordinates. The color table defines for each of a domain of source colors in the source color space a corresponding destination color in the destination color space. An input color represented in the source color space is received. A cell of the color table that encloses the input color is determined. Each corner of the cell represents a source color and a corresponding destination color and one corner of the cell is the cell origin. A location of the input color within the cell is determined in terms of cell coordinate values in a cell coordinate system having an origin coinciding with the cell origin. Each coordinate value corresponds to a dimension of the source color space. The destination color of the cell origin is set to be an initial output color. The highest cell coordinate value for the input color is selected. The destination color at the corner of the cell that is opposite to the cell origin for the source color space dimension corresponding to the selected cell coordinate value is obtained. A contribution to the output color is interpolated using the selected cell coordinate value and the destination colors at the origin and at the opposite corner. The interpolated contribution is added to the output color. A final output color is determined by repeating the steps of selecting, obtaining, interpolating and adding, while using the corner opposite to the cell origin as a new cell origin and excluding processed cell coordinate values, until a termination condition is reached.

The invention can be implemented to realize one or more of the following advantages. Faster interpolation in multi-dimensional color tables may be accomplished, compared to conventional interpolation methods. The interpolation may be significantly faster than conventional linear interpolation for color spaces having four or more dimensions. The interpolation is very fast for color components that have values equal to zero. This is optimal for printing systems that use many spot colors, since this type of printing system rarely uses more than three types of ink per pixel. The invention is easy to implement for an arbitrary number of complex color spaces with multiple dimensions and can be coded without knowing the number of dimensions of the source and destination color spaces, respectively. The invention is also well suited for on-screen proofing of documents with multi-ink or hexachrome colors, since documents of this type generally require a fast color transform into three color components, while the color fidelity is less important.

The details of one or more embodiments of the invention are set forth in the accompanying drawings and the description below. Other features and advantages of the invention will become apparent from the description, the drawings, and the claims.

DESCRIPTION OF DRAWINGS

Like reference numbers and designations in the various drawings indicate like elements.

DETAILED DESCRIPTION

The interpolation method in accordance with the invention will now be described as two exemplary implementations.

Implementation 1

Figure 1:
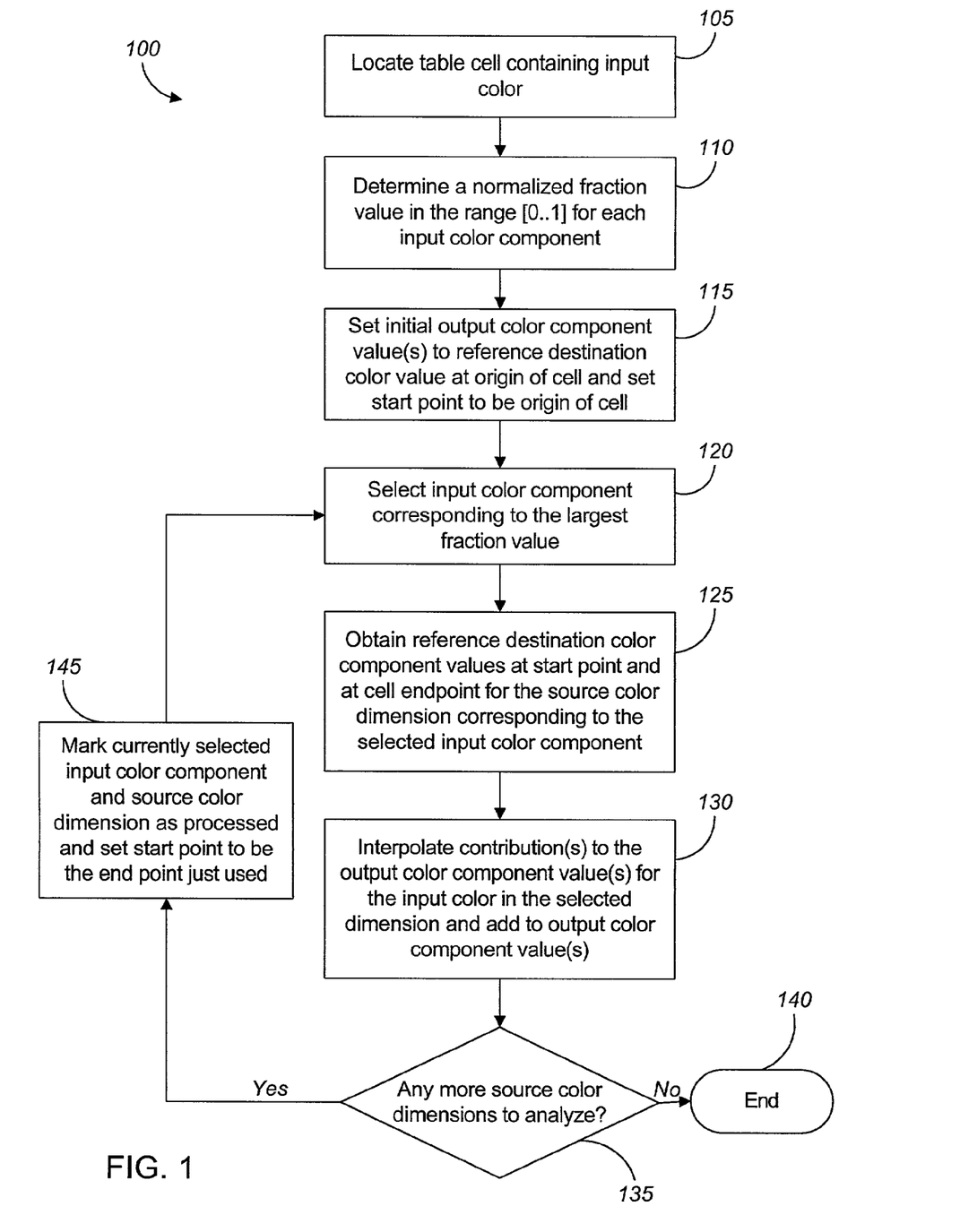
FIG. 1 is a flowchart describing a first implementation of the interpolation method in accordance with the invention.

As shown in FIG. 1, a first interpolation method (100) in accordance with the invention starts with finding an input color in a color table cell (105). A simple example of a color table can be found in FIG. 2. The color table (200) has four table cells and defines a conversion between a two-dimensional source color space and a one-dimensional destination color space. An input color represented by two input color components in a source color space can be converted to an output color that is represented by one output color component in a destination color space using the color table shown in FIG. 2. The color table contains a set of reference source colors and a corresponding set of reference destination colors. A summary of the reference source colors and the reference destination colors can be found in Table 1 below.

TABLE 1

Figure 2:
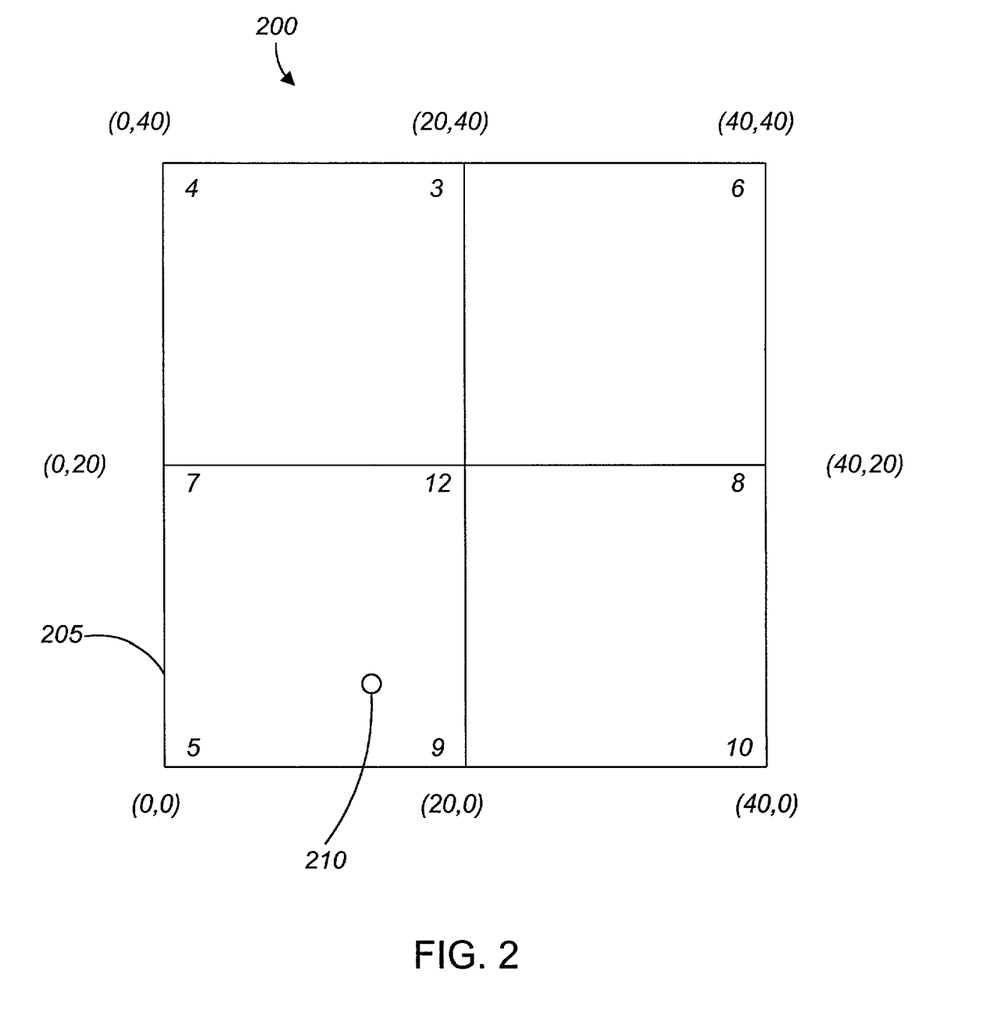
FIG. 2 is a schematic view of a simple color table that maps a two-dimensional source color space to a one-dimensional destination color space.

| Reference source color component 1 | Reference source color component 2 | Corresponding reference destination color component |
|---|---|---|
| 0 | 0 | 5 |
| 0 | 20 | 7 |
| 0 | 40 | 4 |
| 20 | 0 | 9 |
| 20 | 20 | 12 |
| 20 | 40 | 3 |
| 40 | 0 | 10 |
| 40 | 20 | 8 |
| 40 | 40 | 6 |

The mapping from source color space to destination color space does not have to be represented in a table, but can be represented in any structure that can be used to map one set of values to another set of values. The color table in the present example maps colors from a two-dimensional source color space to a one-dimensional destination color space. However, most devices work with three-dimensional, four-dimensional, or even higher dimensions of color spaces. The color table presented above should therefore only be viewed as an illustrative example. The color table does not necessarily have to be limited to mapping colors between two color spaces only. Mappings between several color spaces can be combined into a large "multi-layer" color table. From an administrative point of view, it may be easier to manage a single large table rather than multiple smaller color tables.

For the purpose of this example, assume that a user wishes to convert a two-dimensional input color $C_{in}$=(14, 6) to a one-dimensional output color $C_{out}$ using the process in accordance with the invention. The process locates the table cell (205) containing the input color (210) in the color table (200) based on the input color component values (step 105). For this example, the table cells are numbered 0 ... N−1 in a color table having N cells in a given dimension. The table cell (205) containing the input color is found by dividing each of the input color component values with the number of color component values per cell for the respective cell dimension, and identifying the integer part of the result of the division. In this example, each cell has 20 by 20 color values, so 14/20=0.7 and 6/20=0.3. The integer part of both these divisions is equal to zero, which means that the input color is located in the first cell in the X-direction and the first cell in the Y-direction. The cells do not need to have the same number of color component values for each dimension.

Figure 3:
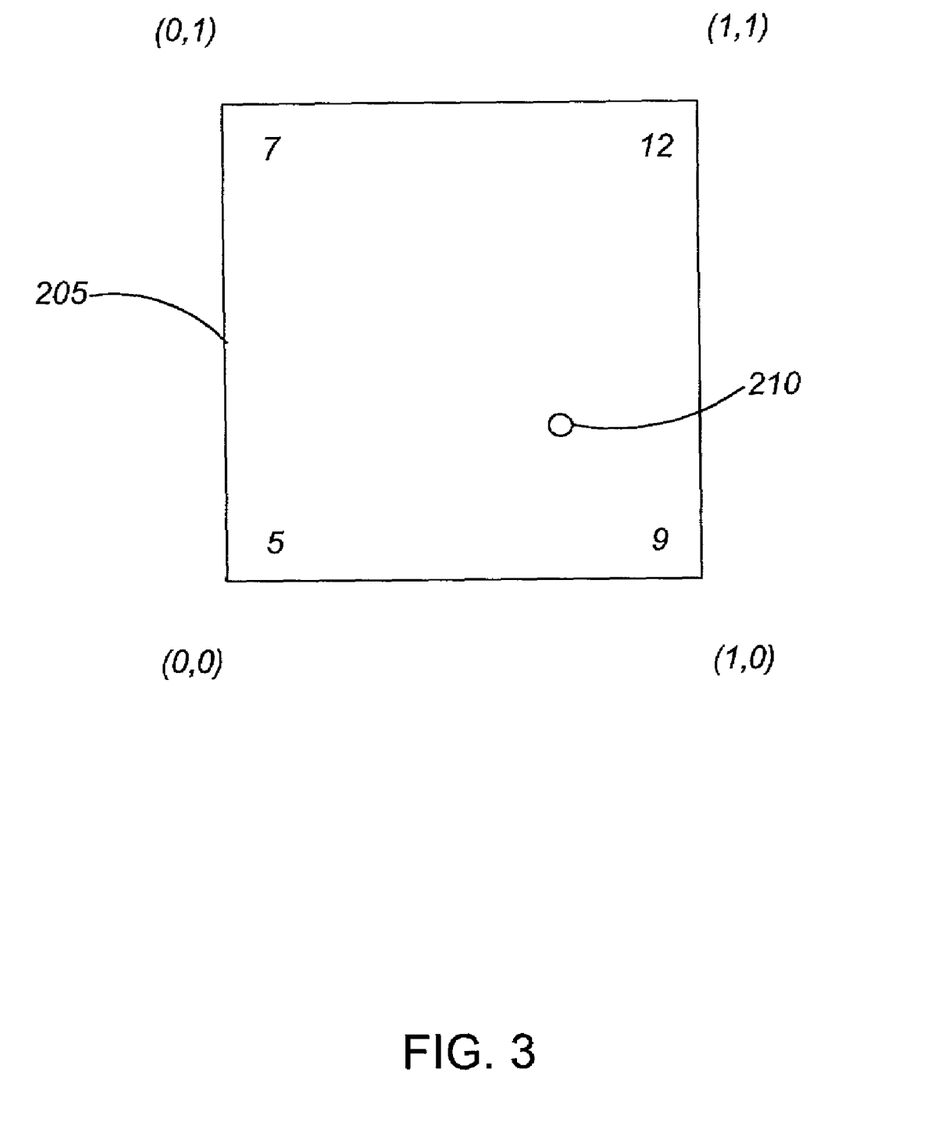
FIG. 3 is a schematic view of a table cell in color table shown in FIG. 2.

When table cell containing the input color has been located, a set of fraction values corresponding to the position of the input color relative the corners of the table cell (205) is determined (step 110). In the present example, the determined fraction values are in the range [0 . . . 1] and correspond to coordinate values in a local coordinate system for the cell, where the origin is at the lower left corner of the cell and the length and height of the cell is one unit, as shown in FIG. 3. The notation [0 . . . 1] denotes a closed interval, that is, including both 0 and 1, while the notation [0 . . . 1 [denotes an interval including 0 but not 1 and ]0 . . . 1] denotes an interval including 1 but not 0. In the present implementation, the fraction values are given by the non-integer part of the results in the above division. Since the input color components are (14, 6) and the dimension of the cell in the color table is 20 by 20 color values, the fraction values, or coordinates of the input color in the cell's local coordinate system are (0.7, 0.3).

Now that the table cell and fraction values have been determined for the input color, the initial output color component value is set to the reference destination color value at the origin of the cell (step 115). In the present example, this corresponds to the value 5. For each interpolation, there will be a start point and an end point. The origin of the cell works as a start point for the first interpolation.

The process then selects the source color dimension corresponding to the largest fraction value for the input color (step 120). In the present example, this is the horizontal dimension that has the fraction value 0.7.

Next, the process obtains the closest reference destination color values for the selected source color dimension (step 125). In the present example, the reference destination color value is 5 at the start point for the interpolation (that is, the origin of the cell) and 9 at the endpoint (that is, the lower right corner of the cell).

When the reference destination color values have been obtained, a contribution from the input color component to the output color component value is interpolated using the reference destination color values and the location of the input color relative the start and end points (step 130). The interpolated value of the output color component is added to the initial value of the output color component. In the present example, the new value of the output color component will be $C_{out}=5+0.7(9-5)=7.8$.

The process is now done with computing the contribution to the output color component from this input color component and determines whether there are any remaining input color component values whose contribution to the output color component value has not been determined (step 135). If all input color components have been processed, then the process ends (step 140). If there still are more input color components, the current input color component and source color dimension are marked as processed (step 145), and the process returns to selecting the input color component presently having a highest fraction value (step 120). In the present example, the new "cell corners" for the remaining input color component will be (1, 0) and (1, 1). The corner (1, 0) will be the new origin, since this was the end point for the previous interpolation.

The reference destination color values selected in step 125 will be 9 at the new start point and 12 at the new end point. The new output color component value calculated in step 130 will thus be $C_{out}=7.8+0.3(12-9)=8.7$. Since all input color dimensions now have been processed, the current value of the output color component corresponds to the final value of the output color component. In the present example this is also the final value of the output color, since the output color only has one output color component.

If there is more than one dimension in the destination color space, the process described above can be repeated for each output color component, and when all the individual output color components have been computed, they are grouped to generate the resulting output color. Alternatively, the process can be run once and all the output color components can be manipulated in parallel, for example, if they are represented in an array.

Implementation 2

The following example shows a method in pseudo-code for converting an N-tuple of color components of an input color represented in an N-dimensional source color space to an M-tuple of color components of a corresponding output color represented in an M-dimensional color space. The pseudo-code will first be listed in its entirety and will then be broken up into smaller segments that are interspersed with explanations of what operations the respective segment performs.

```
ComponentSpacing [0] = address of Table [1][0] . . . [0] – address of Table [0] . . . [0];
ComponentSpacing [1] = address of Table [0][1] . . . [0] – address of Table [0] . . . [0];
                                .
ComponentSpacing [N-1] = address of Table [0][0] . . . [1] – address of Table [0] . . . [0];
While (there are N-tuples to convert){
    Input = next N-tuple;
    indexToCell =0;
    For i from 0 to N-1 {
        SortArray [i].CompID =i;
        SortArray [i].Fraction = (Input [i]*(L-1))-floor(Input [i]*(L-1));
        indexToCell += ComponentSpacing [i]*floor(Input [i]*(L-1));
    };
    address of Cell =(address of Table[0] . . . [0]) + indexToCell;
    Output =Cell[0];
    NextPoint =LastPoint =0;
    Sort (SortArray, by descending SortArray[i].Fraction values );
    For i from 0 to N-1 {
        If (SortArray[i].Fraction ==0 ){break;};
        NextPoint += ComponentSpacing
        [SortArray[i].CompID];
```

```
        While (i < N-1 && SortArray[i+1].Fraction == SortArray[i].Fraction){
            i++;
            NextPoint += ComponentSpacing [SortArray[i].CompID];
        };
        For j from 0 to M-1 {
            Output[j] += SortArray[i].Fraction * ((Cell[NextPoint])[j]-
                (Cell[LastPoint])[j]); };
        LastPoint = NextPoint;
    };
};
```

The pseudo-code shown above will now be explained in greater detail. The input color, Input, is represented as an array of N elements with floating point values in the range of [0 . . . 1]. The output color, Output, is represented as an array of M elements with numerical values. The value range of the elements in the array Output is irrelevant.

This example uses an N-dimensional color table, Table, with L grid points along each dimension. Each grid point represents a reference source color and has a corresponding reference destination color. The table therefore holds a total of $L^N$ reference destination colors. It should be noted that the number of grid points does not have to be the same along each source color dimension. As will be seen below, a component spacing value is determined for each source color space dimension during initialization. All subsequent calculations in the process will be based on normalized values.

As shown below, the process starts by calculating a ComponentSpacing array to describe the offset between adjacent grid points for each dimension. These calculations are performed only once, during initialization. In many systems the value of ComponentSpacing [i] will be $L^{(N-1)}$. Note that the sum of all the elements in the ComponentSpacing array is equal to the address of Table [1][1] . . . [1] minus the address of Table [0] . . . [0].

```
ComponentSpacing [0] = address of Table [1][0] . . . [0] – address of Table [0] . . . [0];
ComponentSpacing [1] = address of Table [0][1] . . . [0] – address of Table [0] . . . [0];
                                .
                                .
ComponentSpacing [N-1] = address of Table [0][0] . . . [1] – address of Table [0] . . . [0];
```

After the ComponentSpacing array has been calculated, the process starts to convert one or more N-tuples of input color components to M-tuples of output color components.

```
    While (there are N-tuples to convert){
        Input = next N-tuple;
```

For each N-tuple the process finds the cell, Cell, in which to interpolate, as shown below. The cell is found through the indexToCell variable. indexToCell represents the location of the grid point in the table that is the point referred to by Input or that is the closest lower grid point to Input. The location of the grid point is represented as an integer in the range [0, $L^N$-1]. Cell is an N-dimensional cell in the table. The cell encloses the point defined by Input and includes the grid point at indexToCell and the next higher grid points in the table for a total of $2^N$ grid points. In one implementation, the data at the cell grid points is retrievable using a single index or a linear combination of the N-tuple values. This is an optimization and is not required for the general method. In this implementation, Cell is a one-dimensional array with $2^N$ output elements. The process also finds the fractions, Fraction, in the range [0, 1] by which to interpolate within the cell. The fractions describe the location of Input within Cell expressed in the cell's coordinate system.

```
indexToCell =0;
For i from 0 to N-1 {
    SortArray [i].CompID =i;
    SortArray [i].Fraction = (Input [i]*(L-1))-floor(Input [i]*(L-1));
    indexToCell += ComponentSpacing [i]*floor(Input [i]*(L-1));
};
address of Cell =(address of Table[0] . . . [0]) + indexToCell;
```

The process then interpolates within Cell using the corner values of Cell. The process starts at the first M-tuple in Cell. This M-tuple is the proper output value when all fractions are zero. The process also initializes the NextPoint and LastPoint variables, which are indexes into Cell and refer to the starting and ending corner points for each interpolation. The range for the NextPoint and LastPoint variables is [0, 1].

```
Output = Cell[0];
NextPoint = LastPoint = 0;
```

The process reorders the components in descending order in an array, SortArray, by component fraction value. SortArray is an N-dimensional array storing information for each component of an N-tuple. Each array element holds CompID, which is a numeric identifier for the component, and a fraction value for a single component.

Before sorting, the array elements are ordered by component order; and after sorting, the array is ordered by decreasing Fraction value.

Sort (SortArray, by descending SortArray[i].Fraction values);

The process interpolates between corners in Cell for each input dimension in the sorted order. If a fraction value is equal to zero, the for-loop below is exited. This is an optimization, as all subsequent fraction values will be equal to zero.

```
For i from 0 to N−1 {
    If (SortArray[i].Fraction ==0 ){break;};
```

The process follows the cell dimension indicated by CompID from LastPoint to its opposite corner in Cell and gets the index to that corner.

NextPoint+=ComponentSpacing [SortArray[i].CompID];

If two or more dimensions have the same fraction value, the process combines these dimensions so that they can be processed simultaneously. This is an implementation-specific optimization that results in faster processing, but is not necessary for the function of the process.

```
While (i < N−1 && SortArray[i+1].Fraction == SortArray[i].Fraction){
i++;
NextPoint += ComponentSpacing [SortArray[i].CompID];
};
```

The process then interpolates from cell corners LastPoint to NextPoint with the fraction for each output component.

```
For j from 0 to M−1 {
    Output[j] += SortArray[i].Fraction * ((Cell[NextPoint])[j]−
    (Cell[LastPoint])[j]);
};
```

The new point becomes the start point for the next interpolation. This completes the computation of the M-tuple corresponding to the N-tuple. The process then continues with the next N-tuple, that is, the next input color, until all input colors have been processed.

```
                LastPoint = NextPoint;
        };
    };
```

The implementations of the invention described above are functional and efficient in particular for input colors having more than four input color components. Conventional interpolation functions have difficulties in handling higher dimensionality efficiently. At the same time, the processes work well for any number of dimensions, starting with one dimension only.

The processing time for these processes is proportional to $N \cdot (k \cdot \log(N)+M)$, which is much faster for a large value of N than the linear interpolation, which is proportional to $(2^N-1) \cdot M$. The number of interpolation calculations is $N \cdot M$, compared to $(2^N-1) \cdot M$ for conventional linear interpolation. The speed advantage over linear interpolation is approximately $2^N/N$. For a hexachrome (N=6) to XYZ (M=3) conversion or a spectral data (N=32) to XYZ (M=3) conversion, a speed improvement of more than ten times can be obtained compared to linear interpolation.

The processes can be very fast for fraction values of zero, which is optimal for printing systems that use many spot colors, as printing systems of this type rarely use more than one ink per pixel. If exactly one input fraction of the table cell is non-zero (that is, the input color is located on one of the edges of a table cell) the processes produce the same results as a linear interpolation, which has well-known properties. If exactly three input fractions are non-zero, the processes produce the same results as tetrahedral interpolation, which has well-known properties. If all non-zero values are the same, the processes only use the diagonal of the table cell (or hypercube, as the case may be when there are more than three dimensions in the source color space). This can be useful in graphic arts for maintaining gray balance. The processes can be more efficient than tetrahedral interpolation, at least for large M values, by combining the edges having the same fraction values and thus eliminating some calculations.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. Different cells in the color table may have different dimensions and different scaling factors can be used to obtain cell coordinates that can be compared. The cell coordinate system may be oriented in any arbitrary way within a cell. The cell coordinates may be arranged from small to large instead of from large to small. The mapping of source and destination colors to cell coordinates may be linear or non-linear, for example, to account for differences in color perception. For example, the steps of the invention can be performed in a different order and still achieve desirable results.

What is claimed is:

1. A computer-implemented method for using a color table, the color table defining a mapping from a source color space representing colors in source color coordinates to a destination color space representing colors in destination color coordinates, the color table defining for each of a domain of source colors in the source color space a corresponding destination color in the destination color space, the method comprising:
receiving an input color represented in the source color space;
determining a location of the input color in a cell of the color table in terms of cell coordinate values in a cell coordinate system, each corner of the cell representing a source color and a corresponding destination color, each coordinate value corresponding to a dimension of the source color space;
determining an order of the cell coordinate values;
determining a processing order of the dimensions of the source color space according to the order of the cell coordinate values; and
using the cell coordinate values in the processing order to calculate an output color represented in the destination color space, making no more interpolation calculations than the number of source color space dimensions multiplied by the number of destination color space dimensions, including detecting when adjacent source color coordinates in the processing order have identical values and in response performing a single interpolation calculation for all the detected adjacent source color coordinates to calculate a single contribution to the calculated output color.

2. The method of claim 1, wherein determining an order comprises determining an order of the cell coordinate values from large to small.

3. The method of claim 1, wherein determining an order comprises determining an order of the cell coordinate values from small to large.

4. The method of claim 1, wherein using the cell coordinate values in the processing order to calculate an output color comprises:
determining whether a cell coordinate value of zero has been reached and establishing that an early termination condition has been reached when a cell coordinate value of zero has been reached;
interpolating a contribution to the output color from each cell coordinate value associated with the input color until a termination condition is reached, while excluding previously processed cell coordinates; and
adding the interpolated contributions to generate an output color corresponding to the input color.

5. The method of claim 4, further comprising establishing that a termination condition has been reached when all cell coordinate values associated with the input color have been processed.

6. The method of claim 1, wherein using the cell coordinate values in the processing order to calculate an output color comprises:
interpolating, in parallel, contributions to all destination color coordinates associated with the output color from each source color coordinate associated with the input color.

7. The method of claim 1, wherein using the cell coordinate values in the processing order to calculate an output color comprises:
interpolating a contribution to one destination color coordinate associated with the output color from each source color coordinate associated with the input color; and
repeating the interpolating step for all remaining destination color coordinates associated with the output color.

8. The method of claim 1, wherein using the cell coordinate values in the processing order to calculate an output color further comprises:
if the input color corresponds to a source color represented in a cell corner, assigning the destination color coordinates associated with the output color to be equal to the destination color coordinates for the destination color corresponding to the source color.

9. The method of claim 1, wherein each cell has a cell coordinate system with a same range of coordinate values.

10. The method of claim 1, wherein the source color space and the destination color space are selected from the group of color spaces consisting of RGB, CMY, L*a*b*, YCC, L*u*v*, Yxy, HSV, CMYK, MCYK, RGBW, hexachrome, and spectral data color spaces.

11. The method of claim 1, wherein the cell coordinate system is aligned with at least one edge of a cell of the color table.

12. A computer-implemented method for using a color table to determine an output color in a destination color space based on an input color in a source color space, the color table defining a mapping from the source color space representing colors in source color coordinates to a destination color space representing colors in destination color coordinates, the color table defining for each of a domain of source colors in the source color space a corresponding destination color in the destination color space, the method comprising:
receiving an input color represented in the source color space;
determining a cell of the color table that encloses the input color, each corner of the cell representing a source color and a corresponding destination color and one corner of the cell being the cell origin;
determining a location of the input color within the cell in terms of cell coordinate values in a cell coordinate system having an origin coinciding with the cell origin, each coordinate value corresponding to a dimension of the source color space;
setting the destination color of the cell origin to be an initial output color;
selecting the highest cell coordinate value for the input color;
obtaining the destination color at the corner of the cell that is opposite to the cell origin for the source color space dimension corresponding to the selected cell coordinate value;
interpolating a contribution to the output color using the selected cell coordinate value and the destination colors at the origin and at the opposite corner;
adding the interpolated contribution to the output color,
determining a final output color by repeating the steps of selecting, obtaining, interpolating and adding, while using the corner opposite to the cell origin as a new cell origin and excluding processed cell coordinate values, at each step determining whether a cell coordinate value of zero has been reached and terminating when a cell coordinate value of zero has been reached.

13. A computer program product, tangibly stored on a computer-readable medium, for using a color table, the color table defining a mapping from a source color space representing colors in source color coordinates to a destination color space representing colors in destination color coordinates, the color table defining for each of a domain of source colors in the source color space a corresponding destination color in the destination color space, comprising instructions operable to cause a programmable processor to:

receive an input color represented in the source color space;

determine a location of the input color in a cell of the color table in terms of cell coordinate values in a cell coordinate system, each corner of the cell representing a source color and a corresponding destination color, each coordinate value corresponding to a dimension of the source color space;

determine an order of the cell coordinate values;

determine a processing order of the dimensions of the source color space according to the order of the cell coordinate values; and use the cell coordinate values in the processing order to calculate an output color represented in the destination color space, making no more interpolation calculations than the number of source color space dimensions multiplied by the number of destination color space dimensions, including detecting when adjacent source color coordinates in the processing order have identical values and in response performing a single interpolation calculation for all the detected adjacent source color coordinates to calculate a single contribution to the calculated output color.

14. The computer program product of claim 13, wherein the instructions to determine an order comprise instructions to determine an order of the cell coordinate values from large to small.

15. The computer program product of claim 13, wherein the instructions to determine an order comprises instructions to determine an order of the cell coordinate values from small to large.

16. The computer program product of claim 13, wherein the instructions to use the cell coordinate values in the processing order to calculate an output color comprise instructions to:

determine whether a cell coordinate value of zero has been reached and establish that an early termination condition has been reached when a cell coordinate value of zero has been reached;

interpolate a contribution to the output color from each cell coordinate value associated with the input color until a termination condition is reached, while excluding previously processed cell coordinates; and add the interpolated contributions to generate an output color corresponding to the input color.

17. The computer program product of claim 16, further comprising instructions to establish that a termination condition has been reached when all cell coordinate values associated with the input color have been processed.

18. The computer program product of claim 13, wherein the instructions to use the cell coordinate values in the processing order to calculate an output color comprise instructions to:

interpolate, in parallel, contributions to all destination color coordinates associated with the output color from each source color coordinate associated with the input color.

19. The computer program product of claim 13, wherein the instructions to use the cell coordinate values in the processing order to calculate an output color comprise instructions to:

interpolate a contribution to one destination color coordinate associated with the output color from each source color coordinate associated with the input color; and repeat the interpolating step for all remaining destination color coordinates associated with the output color.

20. The computer program product of claim 13, wherein the instructions to use the cell coordinate values in the processing order to calculate an output color further comprise instructions to:

assign the destination color coordinates associated with the output color to be equal to the destination color coordinates for the destination color corresponding to the source color if the input color corresponds to a source color represented in a cell corner.

21. The computer program product of claim 13, wherein each cell has a cell coordinate system with a same range of coordinate values.

22. The computer program product of claim 13, wherein the source color space and the destination color space are selected from the group of color spaces consisting of RGB, CMY, L*a*b*, YCC, L*u*v*, Yxy, RSV, CMYK, MCYK, RGBW, hexachrome, and spectral data color spaces.

23. The computer program product of claim 13, wherein the cell coordinate system is aligned with at least one edge of a cell of the color table.

24. A computer program product, tangibly stored on a computer-readable medium, for using a color table to determine an output color in a destination color space based on an input color in a source color space, the color table defining a mapping from the source color space representing colors in source color coordinates to a destination color space representing colors in destination color coordinates, the color table defining for each of a domain of source colors in the source color space a corresponding destination color in the destination color space, comprising instructions operable to cause a programmable processor to:

receive an input color represented in the source color space;

determine a cell of the color table that encloses the input color, each corner of the cell representing a source color and a corresponding destination color and one corner of the cell being the cell origin;

determine a location of the input color within the cell in terms of cell coordinate values in a cell coordinate system having an origin coinciding with the cell origin, each coordinate value corresponding to a dimension of the source color space;

set the destination color of the cell origin to be an initial output color, select the highest cell coordinate value for the input color;

obtain the destination color at the corner of the cell that is opposite to the cell origin for the source color space dimension corresponding to the selected cell coordinate value;

interpolate a contribution to the output color using the selected cell coordinate value and the destination colors at the origin and at the opposite corner;

add the interpolated contribution to the output color;

determine a final output color by repeating the steps of select, obtain, interpolate and add, while using the corner opposite to the cell origin as a new cell origin and excluding processed cell coordinate values, at each step determining whether a cell coordinate value of zero has been reached and terminating when a cell coordinate value of zero has been reached.

* * * * *

UNITED STATES PATENT AND TRADEMARK OFFICE
CERTIFICATE OF CORRECTION

| | |
|---|---|
| PATENT NO. | : 7,023,585 B1 |
| APPLICATION NO. | : 10/010209 |
| DATED | : April 4, 2006 |
| INVENTOR(S) | : Lars U. Borg |

It is certified that error appears in the above-identified patent and that said Letters Patent is hereby corrected as shown below:

Column 14, line 18, delete "RSV" and insert --HSV--.

Signed and Sealed this

Twenty-first Day of November, 2006

JON W. DUDAS
*Director of the United States Patent and Trademark Office*